United States Patent
Kuo et al.

(10) Patent No.: US 9,571,725 B2
(45) Date of Patent: Feb. 14, 2017

(54) ELECTRONIC DEVICE AND IMAGE CAPTURE METHOD THEREOF

(71) Applicant: HTC Corporation, Taoyuan (TW)

(72) Inventors: Ting-Chia Kuo, Taoyuan (TW); Hui-Ping Chen, Taoyuan (TW); Nicole Pauline Sangco, Seattle, WA (US); Sung-Hao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 24 days.

(21) Appl. No.: 14/623,526

(22) Filed: Feb. 17, 2015

(65) Prior Publication Data
US 2016/0065841 A1   Mar. 3, 2016

Related U.S. Application Data

(60) Provisional application No. 62/044,431, filed on Sep. 2, 2014.

(51) Int. Cl.
*H04N 5/232* (2006.01)
*G06K 9/00* (2006.01)
*G06T 7/20* (2006.01)

(52) U.S. Cl.
CPC ........ *H04N 5/23219* (2013.01); *G06K 9/0061* (2013.01); *G06K 9/00261* (2013.01); *G06K 9/00302* (2013.01)

(58) Field of Classification Search
CPC ............ G06K 9/00261; G06K 9/00302; G06K 9/0061; H04N 5/23219; G06T 7/20
USPC ........................ 348/222.1; 382/118, 190, 224
See application file for complete search history.

(56) References Cited

U.S. PATENT DOCUMENTS

| 8,416,996 B2 * | 4/2013 | Ogawa | H04N 5/232 382/118 |
| 9,395,809 B2 * | 7/2016 | Ikeda | G06F 3/005 |
| 2007/0195174 A1 * | 8/2007 | Oren | H04N 5/232 348/222.1 |
| 2008/0317285 A1 * | 12/2008 | Abe | H04N 5/23216 382/103 |

(Continued)

FOREIGN PATENT DOCUMENTS

| CN | 101477621 A | 7/2009 |
| JP | 2012231327 A | 11/2012 |

(Continued)

OTHER PUBLICATIONS

Corresponding partial European Search Report.
Corresponding Taiwanese Office Action.

*Primary Examiner* — Tuan Ho
*Assistant Examiner* — Marly Camargo
(74) *Attorney, Agent, or Firm* — CKC & Partners Co., Ltd.

(57) ABSTRACT

An electronic device and an image capture method thereof are disclosed herein. The image capture method is suitable for an electronic apparatus including an image capture unit. The image capture method includes steps of: providing a first preview image by the image capture unit; detecting a first facial expression from the first preview image; providing a second preview image by the image capture unit after the first preview image; detecting the second facial expression from the second preview image; determining whether the second facial expression is matched to the first facial expression; and, automatically generating a second target image in response to the second facial expression is not matched to the first facial expression.

17 Claims, 8 Drawing Sheets

(56) References Cited

U.S. PATENT DOCUMENTS

| | | | |
|---|---|---|---|
| 2009/0074234 A1* | 3/2009 | Yen | G06K 9/0061 382/100 |
| 2009/0087099 A1* | 4/2009 | Nakamura | G06K 9/00281 382/190 |
| 2010/0157084 A1* | 6/2010 | Shimamura | G06K 9/00228 348/222.1 |

FOREIGN PATENT DOCUMENTS

| | | |
|---|---|---|
| TW | 200915854 A | 4/2009 |
| TW | 201003537 A | 1/2010 |

* cited by examiner

ELECTRONIC DEVICE AND IMAGE CAPTURE METHOD THEREOF

RELATED APPLICATIONS

This application claims the priority benefit of U.S. Provisional Application Ser. No. 62/044,431, filed Sep. 2, 2014, which is herein incorporated by reference.

BACKGROUND

Field of Invention

The present disclosure relates to an electronic device. More particularly, the present disclosure relates to an electronic device capturing consecutive images according to facial expressions.

Description of Related Art

Recently, the advancement of the social network enables people share their status and photos more frequently. Since the shared photos are normally taken by the mobile device (e.g., cell phones, tablets, etc.), image capture applications of the mobile devices are forced to be equipped with some features, e.g. selfie, lenses, photo editing toolbox, etc.

However, some of the features nowadays are not intuitional to use. For example, when a user tries to take a selfie, it is required to hold the mobile device steady in a distance away from the user and to press the shutter button without introducing vibration to the mobile device. Otherwise, the image captured becomes blurred.

As a result, there are several ways to capture images automatically. Referring to FIG. 1, a flow diagram illustrating a conventional image capture method 100 for a camera of a mobile device is presented. In step S102, the mobile device is configured to enter an image capture mode, and the camera is configured to capture a preview image in real time. In step S104, a processor unit of the mobile device is configured to detect a facial expression of the preview image captured by the camera in real time. In step S106, the mobile device determines whether the facial expression corresponds to a smile. If the facial expression corresponds to the smile, the flow goes to step S108. Otherwise, the flow goes back to step S104. In step S108, the camera is configured to capture an image automatically. However, the conventional image capture method 100 only provides a single shot (i.e., capturing one image) when the mobile device enters the image capture mode. Accordingly, the image capture method 100 does not provide an intuitive way for capturing consecutive images.

SUMMARY

The disclosure provides an electronic device including at least one processor and a non-transitory computer-readable medium. The at least one processor is configure to coupled to an image capture unit. The non-transitory computer-readable medium stores computer-executable instructions to be executed by the at least one processor for performing an image capture method. The image capture method includes steps of: periodically refreshing a preview image by the image capture unit; detecting a facial expression from the preview image; determining whether the facial expression matches a previous facial expression, wherein the previous facial expression is previously detected by the at least one processor; and, capturing a target image according to the preview image if the facial expression does not match the previous facial expression.

The disclosure provides an image capture method is suitable for an electronic apparatus including an image capture unit. The image capture method includes steps of: providing a first preview image by the image capture unit; detecting a first facial expression from the first preview image; providing a second preview image by the image capture unit after the first preview image; detecting the second facial expression from the second preview image; determining whether the second facial expression is matched to the first facial expression; and, automatically generating a second target image in response to the second facial expression is not matched to the first facial expression.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
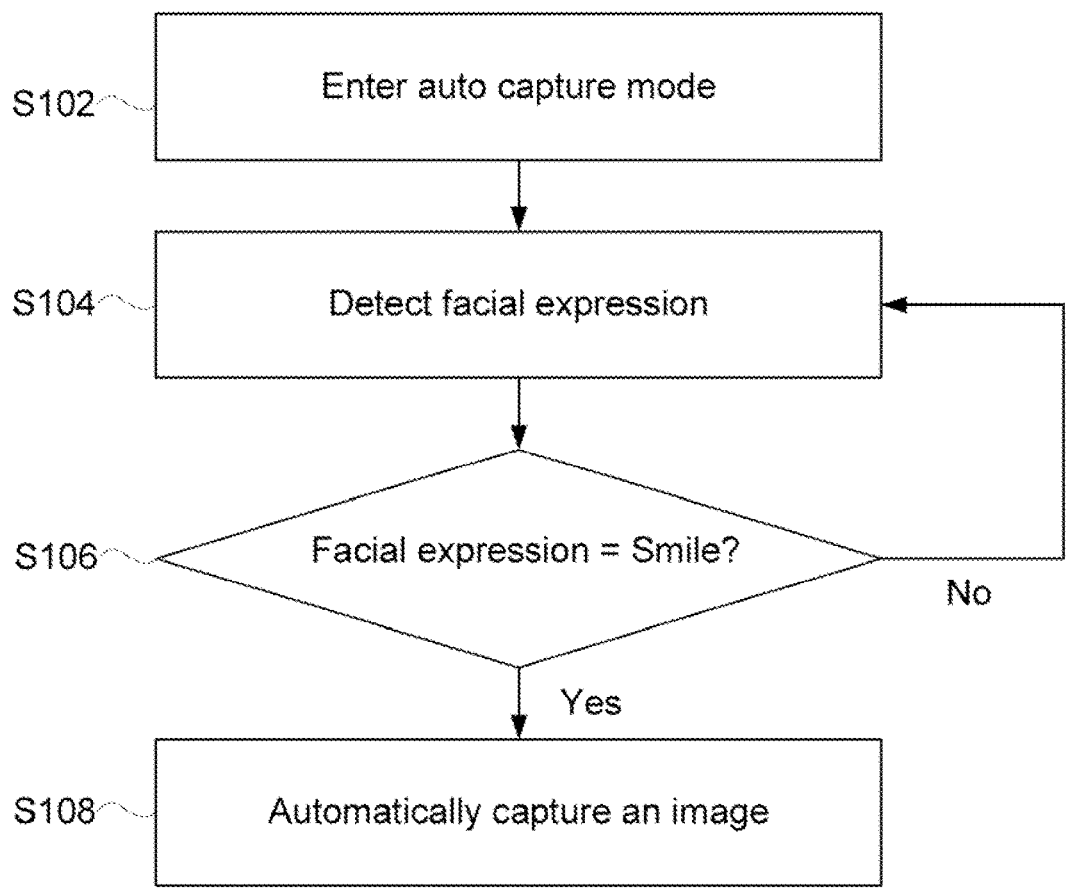
FIG. 1 is a flow diagram illustrating a conventional image capture method.

Reference will now be made in detail to the present embodiments of the disclosure, examples of which are illustrated in the accompanying drawings. Wherever possible, the same reference numbers are used in the drawings and the description to refer to the same or like parts.

Figure 2A:
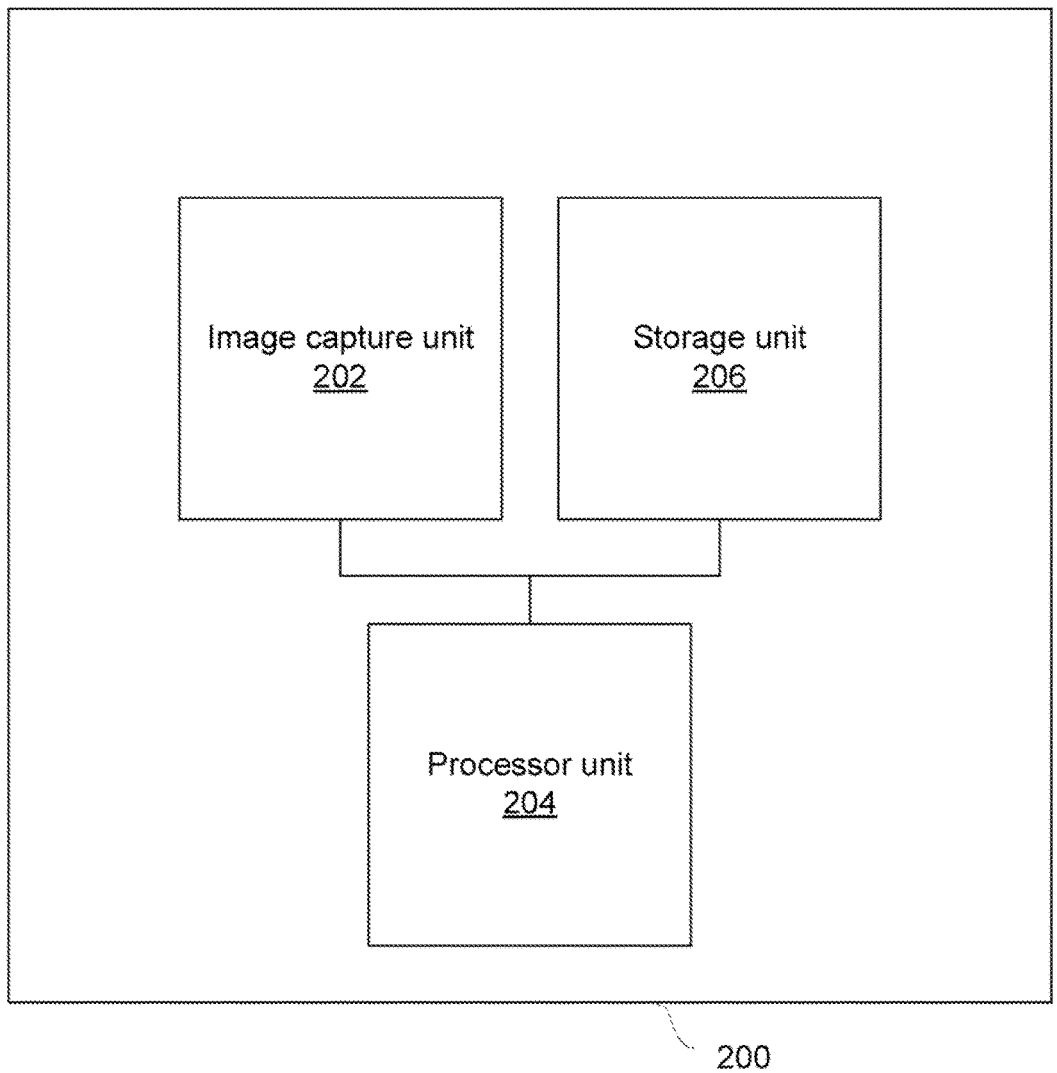
FIG. 2A is a schematic diagram illustrating an electronic device according to one embodiment of the disclosure.

Referring to FIG. 2A, a schematic diagram illustrating an electronic device 200 according to one embodiment of the disclosure is presented. The electronic device 200 includes an image capture unit 202, a processor unit 204 and a storage unit 206. The processor unit 204 is electrically coupled to the image capture unit 202 and the storage unit 206.

The image capture unit 202 is configured to capture a preview image in real time and also to capture at least one target image. The preview image is refreshed periodically (e.g., one preview image per second, 24 preview images per second, etc) and transmitted to the processor unit 204 and/or to a display module (not shown in figures). In some embodiments, the preview image is displayed on the display module, such that the user can see what is going to be shot by the image capture unit 202 through the preview image. After the user manipulates a shutter key/button, the image capture unit 202 is triggered to capture the target image, which can be stored in the storage unit 206. In some embodiments, the image capture unit 202 may be a camera.

In some embodiments, the target image is generated from the preview image at a certain time point by the processor unit. For example, if the image capture unit 202 is configured to capture the target image at a certain time point, the processor unit 204 dumps the preview image at the certain time point as the target image.

In some embodiments, the image capture unit 202 is separately disposed from the electronic device 200 but wirelessly paired with or electrically coupled to the electronic device 200.

The processor unit 204 includes at least one processor, in which the processor unit 204 is configured to execute computer-executable instructions.

The storage module 206 is configured to store facial patterns and computer-executable instructions to be executed by the processor unit for performing image capture methods shown in the following embodiments.

In some embodiments, the storage unit 206 may be a non-transitory computer-readable medium.

Figure 2B:
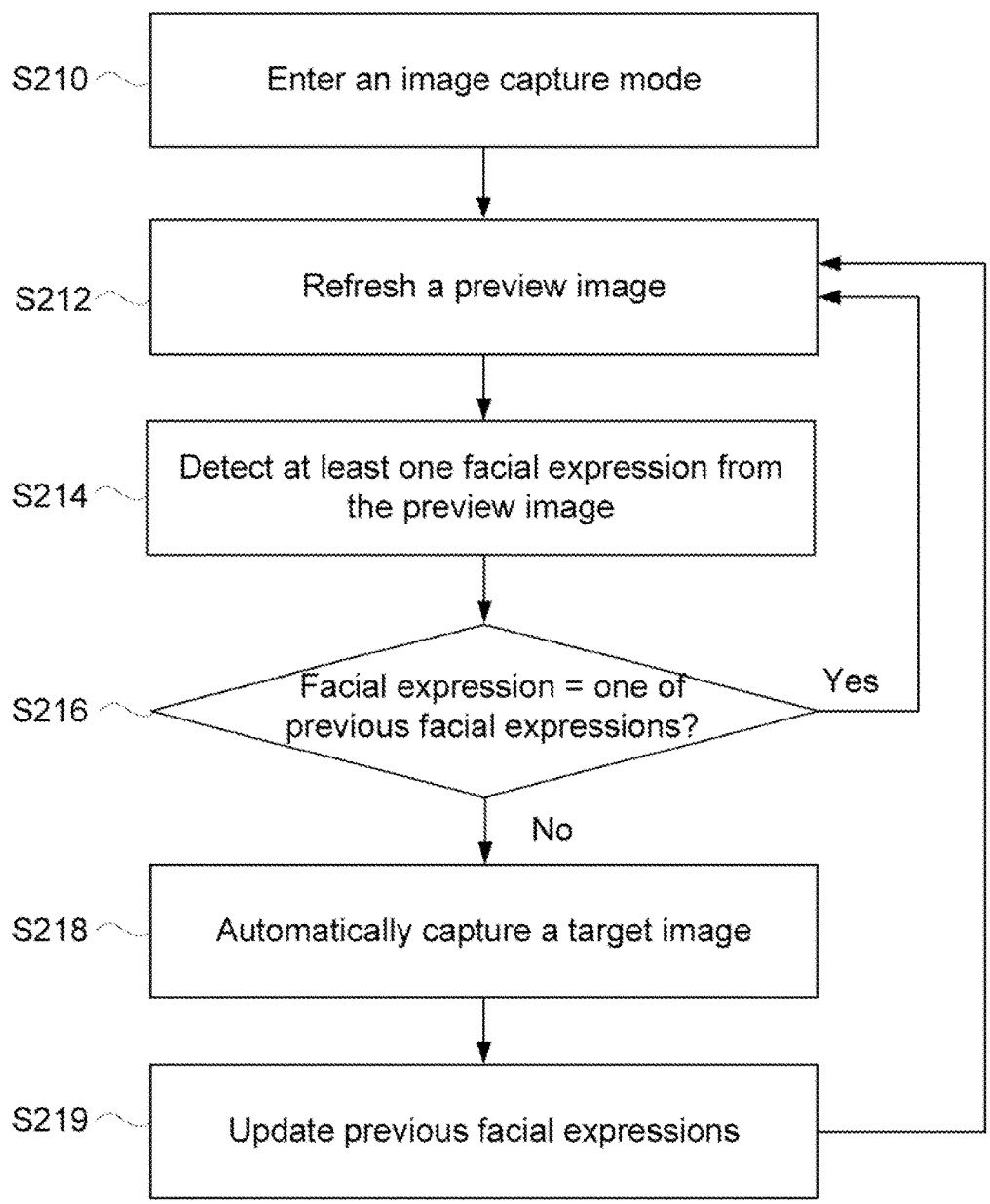
FIG. 2B is a flow diagram illustrating an image capture method according to one embodiment of the disclosure.

Referring also to FIG. 2B, a flow diagram illustrating an image capture method 210 according to one embodiment of the disclosure is presented. The image capture method 210 is suitable for the electronic device 200 shown in FIG. 2A.

In step S210, the processor unit 204 and the image capture unit 202 are configured to enter an image capture mode. During the image capture mode, the image capture unit 202 is activated and ready to capture an image.

In the image capture mode, step S212 is executed for periodically refreshing a preview image in real time (e.g., one preview image per second, 24 preview images per second, etc) by the image capture unit 202. In some embodiments, a display module (not shown in figures) of the electronic device 200 or of the image capture unit 202 is configured to display the preview image in step S212.

In step S214, the processor unit 204 is configured to detect at least one facial expression of the preview image captured by the image capture unit 202 in real time.

In step S216, if the facial expression matches one of previous facial expressions, the flow goes back to step S214. The previous facial expressions are some facial expressions previously detected (before the facial expression detected in the current preview image) and stored/registered by the processor unit 204. In other words, the facial expressions detected in the current preview image will be regarded as the previous facial expressions corresponding to upcoming preview images (captured after the current preview image).

On the other hand, if the facial expression detected in step S216 is different from any of the previous facial expressions, the flow goes to step S218.

When the image capture mode is just initialized (e.g., at the first time of any facial expression detected), there is no previous facial expression has been stored/registered by the processor unit 204 (e.g., data corresponding to the previous facial expressions is configured to be an empty set).

In some embodiments, the previous facial expressions include a set of plural facial expressions detected before the current preview image within a specific time period recently (within ten seconds, one minute, five minutes, etc).

In some embodiments, the previous facial expression only includes only the latest facial expression (e.g., the latest facial expression detected in the latest preview image before the current image). In this case, the detected facial expression is only compared to the latest facial expression in step S216. The latest facial expression is one of the previous facial expressions. The latest facial expression is the most recently detected by the image capture unit 202. In step S216, if the detected facial expression in the current preview image is different from the latest facial expression in the latest preview image, it indicates that the person in the preview image just changes his facial expression (from a smiling face to a crying face, from an angry face to a smiling face, from a smiling face to a wild laughing face, etc), the flow goes to step S218 in this case. In step S218, the image capture unit 202 automatically captures a target image according to the preview image. In some embodiments, the target image can be a duplicated file of the preview image. Or in some other embodiments, the image capture unit 202 is triggered to shoot the target image in response to that the person in the preview image changes his expression (i.e., the detected facial expression in the current preview image is different from the latest facial expression). Afterward, in step S219, the previous facial expressions are updated. In this case, the detected facial expression found in the current preview image is added into the previous facial expressions.

On the other hand, if the detected facial expression is not different (the same or highly similar) from the latest facial expression in step S216, the flow goes back to step S212.

Based on aforesaid embodiments, once the person in the preview image changes his expression (into different expressions, or into different degrees of the same expression), the image capture unit 202 is activated to capture a target image automatically in response to the variance of the expression.

In some embodiments, multiple facial expressions of the preview image are detected in step S214. If one of the facial expressions detected in the preview image is different from each one of the previous facial expressions, the flow goes to step S218. Otherwise, the flow goes to step S214.

In some other embodiments, multiple facial expressions of the preview image are detected in step S214. If each of the detected facial expressions is different from the corresponding previous facial expressions, the flow goes to step S218. Otherwise, the flow goes to step S214.

In some embodiments, multiple facial expressions of the preview image are detected in step S214, in which each of the facial expressions corresponds to an object (e.g., a human or an animal). If a facial expression (corresponding to the object) of the detected facial expressions is different from previous facial expressions corresponding to the first object, the flow goes to step S218. For example, when two facial expressions corresponding to a user A and a user B respectively are detected in step S214, if the facial expression corresponding to the user A is different from each of the previous facial expressions corresponding to the user A, the flow goes to step S218. In other words, it is required for one of the users A and B to change his/her facial expression.

In some embodiments, in step S218, the processor unit 204 sets the preview image at a certain time point (when it is determined that the detected facial expression does not match any of previous facial expressions) to be the target image.

In some embodiments, if the detected facial expression is compared to a latest facial expression in step S216, and if the detected facial expression is different from the latest facial expression, the latest facial expression is replaced with the detected facial expression. For example, if "the latest facial expression" and "facial expression" originally correspond to "a smile" and "a laugh" respectively. Subsequently, in step 228, "a laugh" corresponding to "facial expression" replaces the "a smile" as the "the latest matched facial expression", and the flow goes to step S214.

Accordingly, the image capture method 210 is not required to enter the image capture mode several times for capturing consecutive images since the consecutive images are captured in response to the changing facial expression.

In addition, the image capture method 210 provides the user to capture images with varied facial expressions in an intuitive way.

Figure 2C:
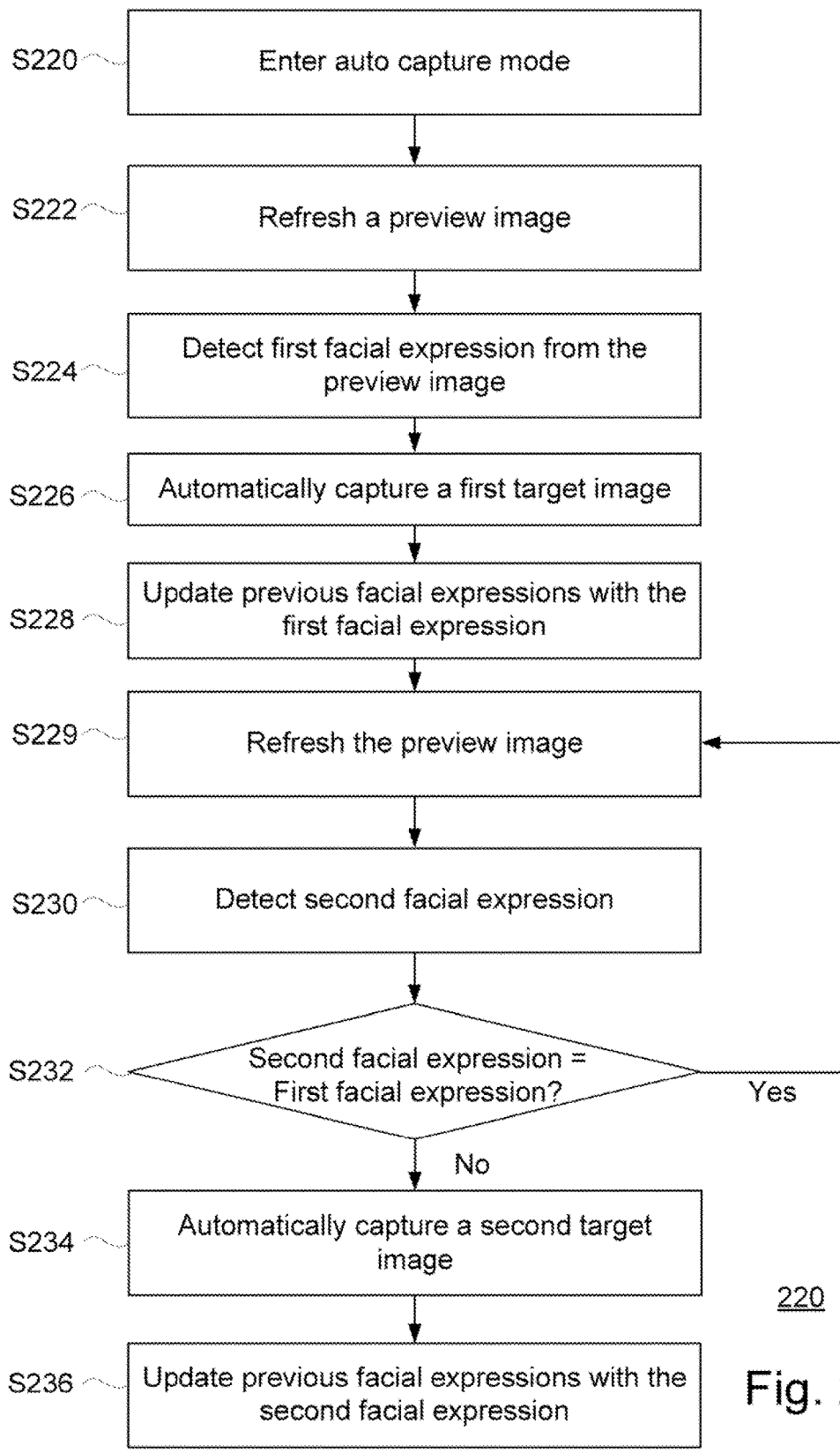
FIG. 2C is a flow diagram illustrating an image capture method according to one embodiment of the disclosure.

Referring also to FIG. 2C, FIG. 2C is a flow diagram illustrating an image capture method 220 according to one embodiment of the present disclosure. Compared to the image capture method 210, the image capture method 220 illustrates more details of when a first target image and a second target image are captured, in which the first target image and the second target image are the first two target images captured after the electronic device 200 enters the image capture mode.

Step S222 is similar to step S212 shown in FIG. 2B.

In step S224, the processor unit 204 is configured to detect a first facial expression of the preview image captured by the image capture unit 202 in real time. In this case, there is no previous image and no previous facial expression has been detected at this moment.

In step S226, the image capture unit 202 captures a first target image automatically. Between step S224 and step S226, a comparison step is skipped (or not show in FIG. 2C) because there is no previous facial expression such that the first facial expression of the preview image will be compared to an empty set in this case. In step S228, the first facial expression detected in the preview image (corresponding to the first target image) is stored as one of the previous facial expressions in the storage unit 206.

After a specific time period (e.g., based on a refresh rate of the preview image), in step S229, the preview image is refreshed by the image capture unit 202. In other words, the image capture unit 202 may refresh/update the current preview image in real time (every second, every ¹⁄₂₄ second, etc).

In step S230, the processor unit 204 is configured to detect a second facial expression of the preview image refreshed by the image capture unit 202 in real time.

In step S232, the processor unit 204 is configured to determine whether the second facial expression matches the first facial expression (previously detected in step S224). If the second facial expression matches the first facial expression, the flow goes back to step S229. On the other hand, if the second facial expression does not match the first facial expression (or known as one of previous facial expressions), the flow goes to step S234.

In step S234, the image capture unit 202 captures the second target image automatically, and the previous facial expressions are updated with addition of the second facial expression. Afterward, any facial expression within upcoming preview images will be detected and compared to the previous facial expressions (or the latest facial expression in the latest captured image), and another image will be captured once the person(s) in the upcoming preview image change his/her expression(s).

Figure 2D:
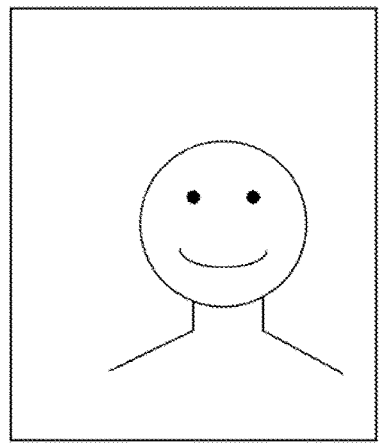
FIGS. 2D-2F are schematic diagrams illustrating different facial expressions according to one embodiment of the disclosure
Figure 2E:
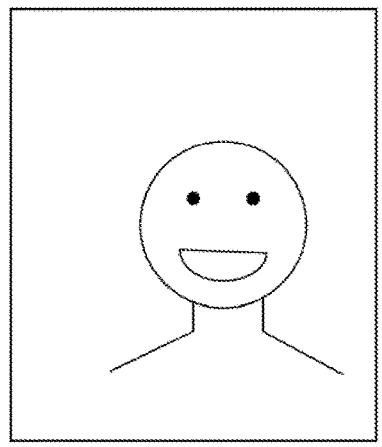
Figure 2F:
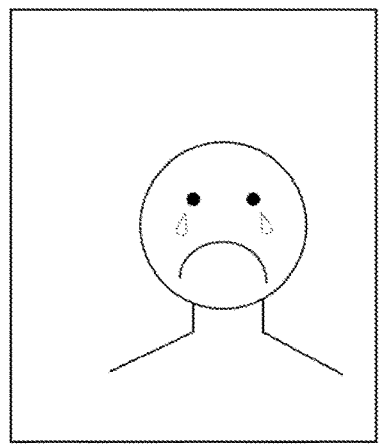

Referring also to FIGS. 2D-2F, schematic diagrams illustrating different facial expressions according to one embodiment of the disclosure are presented. In FIG. 2D, the detected facial expression of a person in the preview image is a smile, and the image shown in FIG. 2D is captured and the detected facial expression (i.e., smile) is stored as a previous matched facial expression. Subsequently, in FIG. 2E, he/she changes his/her facial expression to a laugh (another detected facial expression), and the processor unit 204 determines whether the another detected facial expression (i.e., laugh) matches the previous facial expression (i.e., smile). Since the laugh is different from the smile, the image capture unit 202 captures the image shown in FIG. 2E automatically, and the previous facial expression is updated with addition of the another detected facial expression (i.e., laugh).

In FIG. 2F, he/she changes his/her facial expression to a cry face. Similar to those mentioned above, since the cry face is different from any of the previous facial expressions (i.e., the smile and the laugh), the image capture unit 202 captures the image shown in FIG. 2F automatically, and the previous facial expressions is updated with addition of the cry face.

In aforesaid embodiments, the facial expressions with different preview images (captured at different time points) are compared to each others, so as to estimate whether the person in the preview images changes his/her facial expression between two preview images. In practices, it may be difficult to compare raw detection data of facial expressions directly, because the raw detection data may include many pixels, coordinates, vectors and/or parameters of facial features. The raw detection data includes too much information, which will take a relative long time to compare directly between each others.

Figure 3:
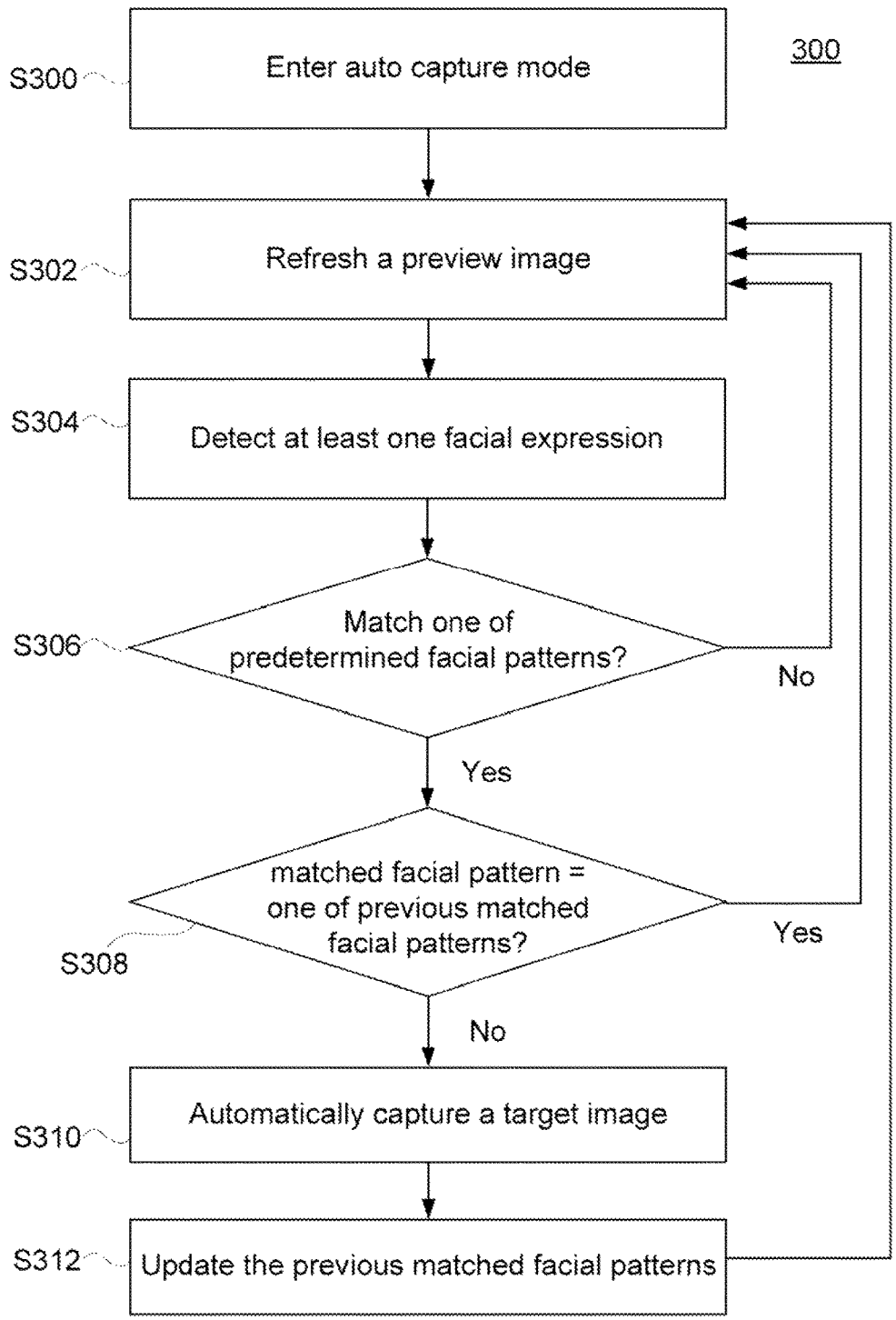
FIG. 3 is a flow diagram illustrating an image capture method according to one embodiment of the disclosure.

Referring to FIG. 3, a flow diagram illustrating an image capture method 300 according to one embodiment of the present disclosure is presented. Compared to the image capture method 210 in FIG. 2B, the steps S300, S302 and S304 are similar to steps S210, S212 and S214. The image capture method 300 in FIG. 3 further includes steps S306, S308, S310 and S312 after step S304. In more details, when at least one facial expression is detected in step S304, the flow goes to step S306.

In the image capture method 300, the facial expression detected in the preview image is mapped with some predetermined facial patterns. The predetermined facial patterns are some prototypes of general facial pattern (smile, laugh, cry, sad, scary, tense, etc).

In step S306, the processor unit 202 is configured to compare the detected facial expression with the predetermined facial patterns. If the facial expression does not match any of the predetermined facial patterns, the flow goes to step S302 such that the processor unit 202 is configured to continuously detect the facial expression. If the facial expression matches one of the predetermined facial patterns, the flow goes to step S308.

In some embodiments, the predetermined facial patterns include facial patterns corresponding to different degrees of smiles and of laughs, in which the degrees of smiles and laughs may be determined based on shapes of lips.

In some embodiments, the predetermined facial patterns include facial patterns corresponding to different types of facial expressions, e.g., different types of grimaces, long faces, etc.

In some embodiments, the processor unit 202 determines whether the facial expression matches one of the predetermined facial patterns according to a similarity value, in which the similarity value is determined according to the facial expression outputted by a facial recognition engine and to one of the predetermined facial patterns. For example, if the similarity value is larger than a predetermined threshold value, it is determined that the facial expression matches the predetermined facial patter. In some embodiments, the facial recognition engine is a program code which is executed by the processor unit.

In some embodiments, if the similarity value is continuously larger than a predetermined threshold value for more than a predetermined time period, it is determined that the facial expression matches the predetermined facial pattern. For example, the predetermined time period is 2 seconds. If the similarity value is larger than the predetermined threshold value only for 1 second, and then the similarity value is less than the predetermined threshold value, it is determined that the facial expression does not match the predetermined facial pattern.

In some embodiments, multiple facial expressions of the preview image are detected in step S304. If each of the facial expressions matches one of the predetermined facial patterns in step S306, the flow goes to step S308. If at least one of the facial expressions does not match any one of the predetermined facial patterns in step S306, the flow goes back to step S302, such that the processor unit is configured to continuously detect the facial expression every time when the preview image is refreshed.

In some embodiments, multiple facial expressions of the preview image are detected in step S304. If one of the facial expressions matches one of the predetermined facial patterns in step S306, the flow goes to step S308. If none of the facial expressions matches one of the predetermined facial patterns in step S306, the flow goes back to step S302 such that the processor unit is configured to continuously detect the facial expression.

In step S308, if the matched facial pattern (the one of the predetermined facial patterns) is the same as one of the previous matched facial patterns, the flow goes back to step S302, in which the previous matched facial patterns are predetermined facial patterns which were previously matched by the detected facial expressions (i.e., the facial expression in the preview image does not change). Accordingly, at the first time of any facial pattern recognized, there is no previous matched facial pattern (e.g., data of the previous matched facial patterns is configured to be an empty set). On the other hand, if the matched facial pattern is different from any of the previous matched facial pattern, the flow goes to step S310.

In some embodiments, the matched facial pattern is only compared to a latest matched facial pattern in step 308, in which the latest matched facial pattern is one of the previous matched facial patterns which were the most recently matched. If the matched facial pattern is not different from the latest matched facial pattern in step S308, the flow goes back to step S304. On the other hand, if the matched facial pattern is different from the latest facial pattern in step S308, the flow goes to step S310.

In some embodiments, multiple facial expressions respectively match one of the predetermined facial patterns in step S306. If the matched facial patterns are all different from any of the previous matched facial patterns, the flow goes to step S308.

In some embodiments, multiple facial expressions respectively match one of the predetermined facial patterns in step S306. If one of the matched facial patterns is different from any of the previous matched facial patterns, the flow goes to step S310.

In some embodiments, multiple facial expressions of the preview image are detected in step S304, in which each of the facial expressions corresponds to an object (e.g., a human or an animal). If one of the facial expressions (corresponding to a first object) matches a predetermined facial pattern in step S306, and if the predetermined facial pattern is different from previous matched facial patterns corresponding to the first object in step 308, the flow goes to step S310. For example, two facial expressions corresponding to a user A and to a user B respectively are detected in step S304, and each of the facial expressions matches one of the predetermined facial patterns in step S306. If the facial pattern corresponding to the user A is different from the each of previous matched facial patterns corresponding to the user A, the flow goes to step S310. In other words, it is required for one of the user A and the user B to change his/her facial expressions such that the flow goes to step S310.

In step S310, the image capture unit 202 automatically captures a target image and stores the target image in a storage unit 206. Meanwhile, the previous matched facial patterns are updated with the addition of the newly matched facial pattern (from the current preview image, which is also the newest target image). Subsequently, the flow goes back to step S304.

In some embodiments, the matched facial pattern is only compared to a latest matched facial pattern in step S308. Accordingly, in step S310, the latest matched facial pattern is replaced with the matched facial pattern in the current preview image (i.e., the newest target image).

Accordingly, the image capture method 300 is able to automatically capture a new image every time when the target person(s) changes his/her expression(s).

According to the capture methods 210, 220, 300 shown in FIGS. 2B, 2C and 3, when the electronic apparatus is just switched into the auto capture mode, the very first target image will be captured according to the preview image at the beginning (because there will be no previous facial expression or previous facial pattern at that time). However, the very first target image may not be an ideal target image to capture, because the person in the preview image may not be ready to take his/her photograph at the moment, or the photographer is not holding the electronic apparatus steadily enough to capture a high quality photo (at the first moment that the auto capture mode is turned on). Therefore, the following embodiments provide a confirming feature before capturing the very first target image in response to the electronic apparatus is just switched into the auto capture mode.

Figure 4:
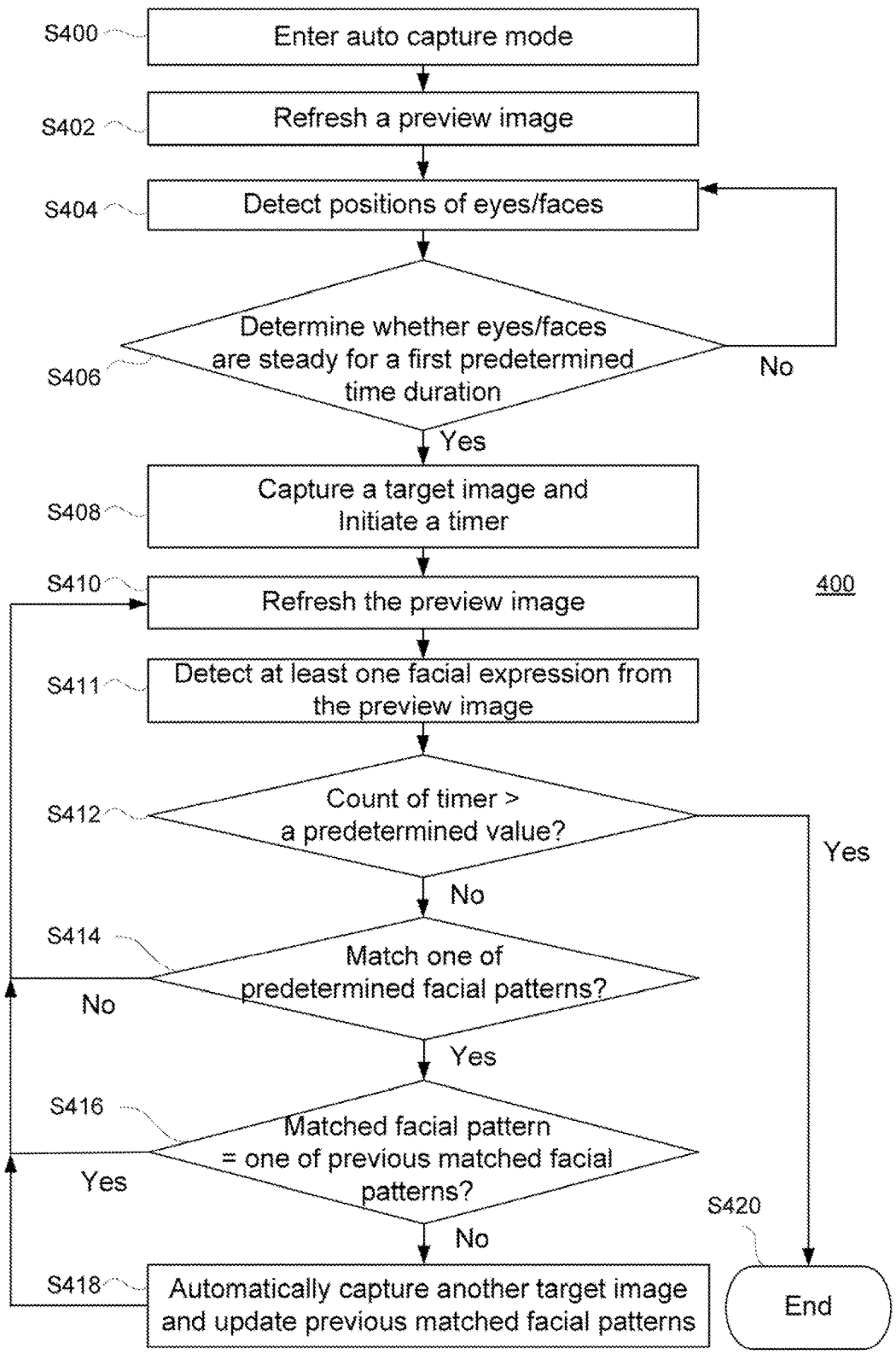
FIG. 4 is a flow diagram illustrating an image capture method according to one embodiment of the disclosure.

Referring also to FIG. 4, FIG. 4 is a flow diagram illustrating an image capture method 400 according to one embodiment of the present disclosure. Compared to the image capture method 210, the steps S400 and S402 are similar to the step S210 and S212.

In step S404, the processor unit 204 is configured to detect positions of eyes or of faces on a preview image captured by the image capture unit 202 in real time. Then, the processor unit 204 determines whether the positions of eyes or of faces are steady for a first predetermined time duration. If the positions of eyes or of faces are not steady for more than the first predetermined time duration, the flow goes back to step S404. If the positions of eyes or of faces are steady for more than the first predetermined time duration, the flow goes to step S408. In other words, step S404 is configured to detect whether persons in the preview image are ready for capturing images (according to their eyes/faces are steady or not). In this case, the target image will be only captured after the users are ready.

In step S408, the image capture unit 202 captures a target image and store the target image in a storage unit 206. Meanwhile, the processor unit 204 is configured to start a timer.

In step S410, the image capture unit 202 refreshes the preview image, and the preview image is updated to a current scene in front of the image capture unit 202.

In step S411, the processor unit 204 is configured to detect at least one facial expression on the preview image captured by the image capture unit 202 in real time.

In step S412, the processor unit 204 determines whether a count of the timer is greater than a predetermined value. If the count of the timer is greater than the predetermined value, the flow goes to step S420, and the image capture method 300 ends accordingly in step S420. If the count of the timer is not greater than the predetermined value, the flow goes to step S414. In other words, the image capture unit 202 is configured to capture the images in a fixed time length of the predetermined value. For example, if the predetermined value is 10 seconds, the image capture unit 202 is configured to capture the images until the count of the time reaches 10 seconds.

In step S414, the processor unit 204 detects whether the facial expression matches one of the predetermined facial patterns. If the facial expression does not match any of the predetermined facial patterns, the flow goes to step S410. If the facial expression matches one of the predetermined facial patterns, the flow goes to step S416.

In step S416, the processor unit 204 detects whether the matched facial pattern is the same as one of the previous matched facial patterns. If matched facial pattern is the same as one of the previous matched facial patterns, the flow goes back to step S410. If matched facial pattern is not the same as any of the previous matched facial patterns, the flow goes to step S418.

In some embodiments, the matched facial pattern is only compared to a latest matched facial pattern in step S416, in which the latest matched facial pattern is one of the previous matched facial patterns which was the most recently matched. If the matched facial pattern is different from the latest matched facial pattern in step 416, the flow goes back to step S410. On the other hand, if the matched facial expression is different from the latest matched facial pattern in step S416, the flow goes to step S418.

In step S418, the image capture unit automatically captures another target image and stores the target image in a storage unit. Meanwhile, the previous matched facial patterns are updated with the addition of the matched facial pattern. Subsequently, the flow goes back to step S410.

In some embodiments, the matched facial pattern is only compared to a latest matched facial pattern in step S416. Accordingly, in step S418, the latest matched facial pattern is replaced with the matched facial pattern.

In some embodiments, there is a minimum time duration (e.g., one second) configured between capturing two consecutive target images. The minimum time duration are utilized to prevent the image capture method 400 from being over-sensitive. If the facial expression in the preview image is detected to be changed very fast (ten times in one second), the detection result about fast variation of the facial expression may be incorrect (because the person shall not change his/her expression dramatically in such a short time in practices). The over-sensitive detection result sometimes happens when the person's face is shaking or the camera is moving. It is not ideal to capture ten target images in one second due to these over-sensitive detection results. According to the image capture method 400, two target images will be at least gapped by the minimum time duration (e.g., one second).

Figure 5:
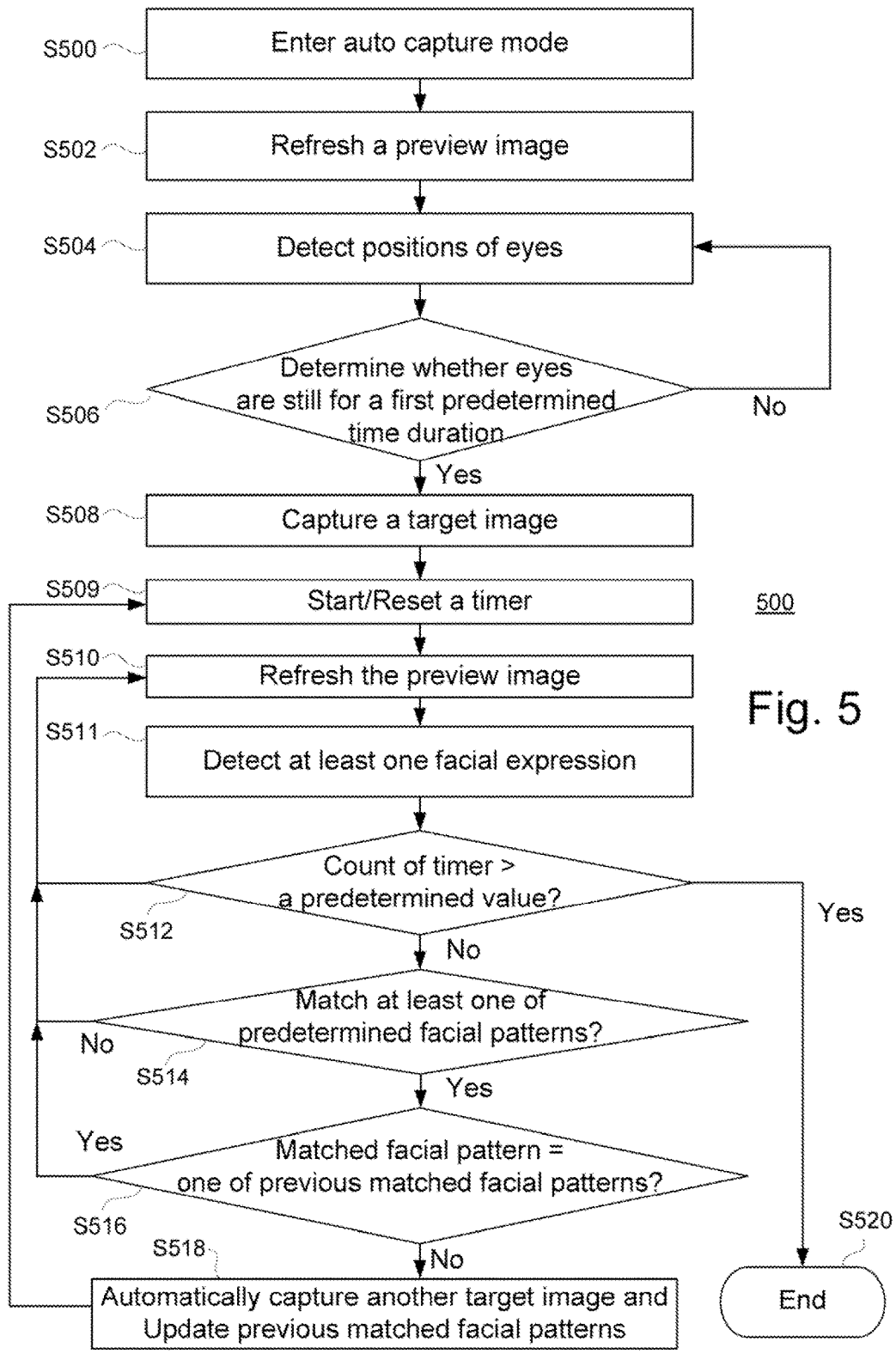
FIG. 5 is a flow diagram illustrating an image capture method according to one embodiment of the disclosure.

Referring to FIG. 5, FIG. 5 is a flow diagram illustrating an image capture method 500 according to one embodiment of the present disclosure. Compared to the image capture method 400, the steps S500, S502, S504 and S506 are similar to the steps S400, S402, S404 and S406 for determining whether the person in the scene is ready for photo-shooting already.

In step S508, the image capture unit 202 captures a target image, in which the image is stored in a storage unit 206.

In step S509, the processor unit 204 is configured to start or to reset a timer. For the first time in step S509, the processor unit 204 is configured to start the timer. Otherwise, the processor unit 204 is configured to reset the timer.

The steps S510, S511, S512, S514, S516 and S520 are similar to the steps S410, S411, S412, S414, S416 and S420 in FIG. 4.

In step S518, the image capture unit 202 automatically captures another target image and stores the target image in a storage unit 206, and the previous matched facial patterns are updated with the addition of the matched facial pattern. Subsequently, the flow goes back to step S509 such that the timer is reset. In other words, when the facial expression changes within a time length of the predetermined value such that another predetermined facial pattern is matched, the processor unit reset the timer. For example, the predetermined value is 5 second. The facial expression matches one of the predetermined facial patterns when the count of the timer is 3 seconds. Subsequently, the timer is reset such that the count of the timer becomes 0 second, and the image capture unit 202 is configured to capture another image when the facial expression matches another one of the predetermined facial patterns within another 5 seconds.

In some embodiments, the matched facial pattern is only compared to a latest matched facial pattern in step S516. Accordingly, in step S518, the latest matched facial pattern is replaced with the matched facial pattern.

In some embodiments, the minimum time duration between two consecutive captured images is 1 second. The minimum time duration are utilized to prevent the image capture method 500 from being over-sensitive. According to the image capture method 400, two target images will be at least gapped by the minimum time duration (e.g., one second).

Based on those mentioned above, the image capture method 400 is configured to automatically capture the images according to the variation of the facial expressions in a fixed time duration, e.g., 5 or 10 seconds, and the image capture method 500 is configured to automatically capture the images according to the variation of the facial expressions in a varied time duration (the time duration will be extended in response to a new target image is captured).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. An electronic device, comprising:
  a storage unit, configured to store a plurality of predetermined facial patterns, each of the predetermined facial patterns corresponding to one of different types or different degrees of facial expressions; and
  at least one processor, configured to be coupled with an image capture unit and the storage unit, the at least one processor being adapted to:
    periodically refresh a first image by the image capture unit;
    detect a facial expression from the first image;

determine whether the facial expression matches any one of the predetermined facial patterns;

when the facial expression from the first image matches one of the predetermined facial patterns, determine whether the matched one of the predetermined facial patterns matches a previous matched facial pattern, the previous matched facial pattern is determined by matching a previous facial expression from a previous first image to the predetermined facial patterns; and capture a target image according to the first image in response to the matched one of the predetermined facial patterns does not match the previous matched facial pattern.

2. The electronic device of claim 1, wherein the at least one processor is further adapted to:

update the previous facial expression with the facial expression detected from the first image.

3. The electronic device of claim 1, wherein the previous facial expression is defaulted as an empty set before any facial expression has been detected.

4. The electronic device of claim 1, wherein one of the previous facial expression is a latest facial expression which is most recently detected by the image capture unit.

5. The electronic device of claim 1, wherein the at least one processor is further adapted to:

detect positions of eyes in the first image;

determine whether the positions are steady for a first predetermined time duration; and capture a first target image by the image capture unit in response to the positions are steady for more than a first predetermined time duration.

6. The electronic device of claim 5, wherein the at least one processor is further adapted to:

initiate a time count since the first target image is captured;

determine whether the time count is less than a predetermined value;

detect the facial expression in the first image in response to the time count is less than the predetermined value; and capture a second target image by the image capture unit according to the first image in response to the matched one of the predetermined facial patterns does not match the previous matched facial pattern.

7. The electronic device of claim 6, wherein the time count is reset in response to the output image being generated by the image capture unit.

8. An image capture method, suitable for an electronic apparatus comprising an image capture unit, wherein the image capture method comprises:

providing a first image by the image capture unit;

detecting a first facial expression from the first image;

matching the first facial expression with a first predetermined facial pattern selected from the predetermined facial patterns; and providing a second image by the image capture unit after the first image;

detecting the second facial expression from the second image;

matching the second facial expression with a second predetermined facial pattern selected from the predetermined facial patterns;

determining whether the second facial expression is matched to the first facial expression by determining whether the second predetermined facial pattern matches the first predetermined facial pattern; and automatically generating a second target image in response to the second predetermined facial pattern is not matched to the first predetermined facial pattern.

9. The image capture method of claim 8, further comprising:

capturing a first target image by the image capture unit corresponding to the first image; and storing the first facial expression as a previous facial expression corresponding to the second image.

10. The image capture method of claim 9, wherein the second target image is captured in response to the second facial expression is not matched to the previous facial expression.

11. The image capture method of claim 9, wherein the image capture method further comprises:

detecting positions of eyes in the first image;

determining whether the positions are steady for a first predetermined time duration; and capturing the first target image by the image capture unit in response to the positions are steady for more than a first predetermined time duration.

12. The image capture method of claim 9, wherein the image capture method further comprises:

initiating a time count since the first target image is captured;

determining whether the time count is less than a predetermined value; and detecting the second facial expression in the second image in response to the time count is less than the predetermined value.

13. The image capture method of claim 12, wherein the time count is reset in response to the output image being generated by the image capture unit.

14. The image capture method of claim 8, wherein the first image and the second image are provided in sequences according to a refreshing frequency of the image capture unit.

15. The image capture method of claim 8, wherein the second target image is duplicated from the second image automatically in response to the second predetermined facial pattern is not matched to the first predetermined facial pattern.

16. The image capture method of claim 8, wherein the second target image is captured by the image capture unit automatically in response to the second predetermined facial pattern is not matched to the first predetermined facial pattern.

17. The image capture method of claim 8, wherein the step of determining whether the second facial expression is matched to the first facial expression further comprising:

determining whether the second facial expression is matched to a previous facial expression detected before the second image, wherein the second target image are generated in response to the second predetermined facial pattern is not matched to the first predetermined facial pattern and the previous facial expression.

* * * * *